Aug. 23, 1927.

J. R. GAMMETER 1,639,885

PRECISION ADJUSTMENT DEVICE

Filed Sept. 13, 1922

Inventor
John R. Gammeter
By Robert M. Pierson
Atty.

Patented Aug. 23, 1927.

1,639,885

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

PRECISION ADJUSTMENT DEVICE.

Application filed September 13, 1922. Serial No. 587,928.

This invention relates to devices for minute, angular adjustment of rotatable members and is particularly useful in the adjustment of extremely sensitive devices such as are used in radio apparatus.

My chief object is to provide an improved adjustment device wherein a manually moved part is adapted to drive the part to be adjusted at a relatively very low speed, and in which the driving connection between said parts is positive. A further object is to provide such a device in which major adjustments may be quickly made by manually moving one part and further, more minute adjustment may be had by manually moving another part with relation to the first said part. A further object is to provide an improved device in which the precise setting of the part to be adjusted may be readily ascertained and recorded as a guide for subsequent settings thereof. Further objects are to provide a self-contained device presenting a neat appearance, having its mechanism enclosed, and presenting to the operator only parts of simple external form which may conveniently be made of dielectric material such as hard rubber. A further object is to provide an improved device which readily may be substituted for adjustment devices now commonly used in radio apparatus with a minimum modification of the apparatus. A further object is to provide a main dial which may be manually moved for major adjustments, in combination with an auxiliary dial adapted to be manually moved with relation to the main dial for finer adjustments, the construction being such that the main dial, in being manually moved, will move the auxiliary dial with it, so that their setting with relation to each other is preserved during such manual movement of the main dial.

Of the accompanying drawings, Fig. 1 is a plan view of a preferred form of my improved adjustment device.

Fig. 2 is a section on line 2—2 of Fig. 1.

Fig. 3 is a section on line 3—3 of Fig. 2.

Referring to the drawings, 10 is a panel or instrument board such as is used in radio apparatus, the same being formed with an aperture through which projects a hollow, slotted stem 11 formed integrally with a hand-knob 12 on the front side of the board, said knob and its stem preferably being formed of molded hard rubber. In the hollow end of said slotted stem is clamped one end of a shaft or stem 13 which is to be angularly adjusted, the slotted stem being contracted against said shaft, and also held against withdrawal from the board, by a collar 14 on the reverse side of the latter and a set-screw 15 threaded through one side of said collar.

Upon an enlarged base portion 16 of the stem 11 is journaled a bell-shaped auxiliary dial member 17 having on its outer periphery a substantially conical dial surface 18 provided with an indicator 19 which may be molded or painted thereon, said indicator being adapted to register upon a scale 20 marked upon the conical dial surface 21 of a main dial member 22 journaled upon the stem 11, the conical dial surfaces of said dial members being substantially in extension of each other. An indicator 20ª is marked upon the board 10 and adapted to register upon said scale 20 of the main dial. Said main dial member 22 is formed, on its side adjacent the board 10, with a semi-circular groove 23 into which a stud 24 projects from said board, to limit the rotation of said main dial to 180 degrees, such limitation being desirable in certain radio apparatus, although this feature may, of course, be omitted. At another point the main dial member 22 is formed, on said side adjacent the board 10, with a recess 25 in which is mounted a plunger 26 backed by a spring 27, said plunger being adapted to act as a brake against the board 10 to hold said main dial in adjusted positions and particularly when the auxiliary dial 17 is turned with relation to said main dial for minute adjustments of the shaft 13 as hereinafter described.

For slowly turning the stem 11 for such minute adjustments, a worm-gear 28 is mounted on said stem, said gear being formed with a lug 29 fitting into a recess 30 formed in the enlarged base portion 16 of said stem and said gear being held against said base portion by the hub 22ª of the main dial 22. Meshed with said worm gear 28 is a worm 31 journaled in a two-armed bracket 32 secured to the floor of an annular recess 33 formed in the front side of the main dial member 22, one of the arms of said brackets being apertured to receive a reduced end of the shaft of said worm and the other arm of said bracket being slotted from its side opposite the stem 11, as indicated at 34, Fig.

2, to receive a waisted portion of the shaft of said worm. The end of said shaft adjacent said slotted bracket arm is formed integrally with a beveled worm gear 35 meshed with an internal worm thread 36 formed on the inner face of the bell-shaped auxiliary dial member 17, said worm thread being adapted to drive the worm gear 35, while holding the worm 31 in the bracket 32, when the auxiliary dial 17 is turned with relation to the main dial 22.

For holding the several parts of the device in assembled relation when, on occasion, it is removed from the board 10, as it may be by simply loosening the set screw 15 and slipping the collar 14 from the stem 11, a washer 37 is mounted upon the stem 11 and held against the rear face of the main dial 22 by a spring 38 seating in an annular groove formed in said stem, said clip being readily removable to permit the disassembling of the device.

In the operation of the device, approximate adjustment is made by manually turning the hand knob 12 or the main dial 22, the construction being such that these parts and the auxiliary dial 17 all turn together in either case. The shaft 13 may then be further and more minutely adjusted by turning the auxiliary dial 17 while the main dial 22 is held stationary by the brake plunger 26, said auxiliary dial driving the knob 12 with its stem 11 at relatively slow speed through the medium of the worm threads and gears, the latter providing a double reduction of speed by which an extremely fine adjustment may be had.

The internal worm thread 36, acting against the worm gear 35, as well as the worm 31 acting against the worm gear 28, constitutes a crowding means for rotating the shaft 13 with relation to the main dial 22, and the crowding angle of said means, giving a very high speed-reduction ratio, is such that the main dial 22 and the shaft 13 are effectively interlocked against relative angular movement as to any force acting between them except through said crowding means.

The setting of the device is accurately recorded by the indicators 19 and 20ª, and since the indicator 19 is located on the outer periphery of the auxiliary dial, which is the most rapidly moving part of the speed reduction means, the most minute movements of the shaft 13 is readily discerned by noting the corresponding, relatively large movement of said indicator, a vernier scale or a magnifying glass being unnecessary. Although providing these several advantages and others set forth in the statement of the objects of the invention, the device may be substituted for simple dials of a type heretofore commonly used with radio apparatus, for example, by simply removing the old dial, slipping the new device into place and tightening the set screw 15, unless it is desired to limit the rotation of the main dial to 180° as above described, in which case the only further requirement is the mounting of the stud 24 in the instrument board 10. The device is of neat appearance, convenient and effective in use, and all of its exposed parts may conveniently be molded of insulating material.

I claim:

1. In a precision adjustment device, the combination of an instrument mounting having mounted thereon a rotatable part to be angularly adjusted, a dial member journaled concentrically with relation to said part, speed reduction means carried by said dial member for rotating said part with relation to said dial member, and an auxiliary dial member journaled concentrically with relation to said part and operatively connected to said part through said speed reduction means.

2. In a precision adjustment device, the combination of an instrument mounting having mounted thereon a rotatable part to be angularly adjusted, a main dial member journaled concentrically with said part, means for securing said main dial member in different angular positions, an auxiliary dial member journaled concentrically with relation to said part, speed reduction means mounted on said main dial member and interposed operatively between the said auxiliary dial member and the said part and adapted to drive the latter with relation to said main dial member, and means for registering the movements of said dial members.

3. In a precision adjustment device, the combination of an instrument mounting having mounted thereon a rotary part to be angularly adjusted, a dial member journaled concentrically with relation to said part, a worm-drive device carried by said member and adapted to drive said part with relation to said member, and an auxiliary dial member journaled concentrically with relation to said part and adapted to drive said worm-drive device.

4. In a precision adjustment device, the combination of an instrument mounting having mounted thereon a rotary part to be angularly adjusted, a main dial member journaled thereon, a worm gear concentric and non-rotatable with relation to said part, a worm journaled on said main dial member and meshed with said worm gear, a worm gear concentric and non-rotatable with relation to said worm, and an auxiliary dial member journaled concentrically with relation to said dial member and provided with an internal worm thread meshed with the last said worm gear.

5. In an electrical instrument adjusting device, a dial, a shaft rotatably mounted in the dial and to which the movable member of the instrument is attached, a second shaft rotatably mounted in the dial, means for operating the first from the second shaft for moving the member on the first shaft and means for rendering the dial inoperative when the second shaft is operated.

6. In combination, a rotatable dial, a shaft carried thereby when the dial is rotated, means on the shaft to be adjusted, said shaft being rotatably mounted in the dial, means for retaining the dial in a fixed position, a second shaft rotatably mounted in the dial, operative connecting means between the shafts for operating the first mentioned shaft from the second shaft for finally adjusting the means on the first shaft.

7. In combination, a rotatably mounted dial, means for frictionally retaining the dial in any angular position, two shafts rotatably mounted in the dial, means for rotating one shaft from the other, graduation means for determining the distance or amount one shaft is rotated by the other.

In witness whereof I have hereunto set my hand this 7 day of September, 1922.

JOHN R. GAMMETER.